(12) United States Patent
Murata et al.

(10) Patent No.: US 12,429,040 B2
(45) Date of Patent: Sep. 30, 2025

(54) ROLLING DIAPHRAGM PUMP

(71) Applicant: NIPPON PILLAR PACKING CO., LTD., Osaka (JP)

(72) Inventors: Keisuke Murata, Osaka (JP); Atsufumi Kinoshita, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 91 days.

(21) Appl. No.: 18/381,810

(22) Filed: Oct. 19, 2023

(65) Prior Publication Data

US 2024/0167465 A1 May 23, 2024

(30) Foreign Application Priority Data

Nov. 22, 2022 (JP) ................. 2022-186459

(51) Int. Cl.
*F04B 43/00* (2006.01)
*F04B 9/02* (2006.01)
*F04B 43/04* (2006.01)
*F16H 7/02* (2006.01)
*F16H 25/18* (2006.01)

(52) U.S. Cl.
CPC ............ *F04B 43/0063* (2013.01); *F04B 9/02* (2013.01); *F04B 43/04* (2013.01); *F16H 7/02* (2013.01); *F16H 25/18* (2013.01)

(58) Field of Classification Search
CPC ........ F04B 43/0063; F04B 43/04; F04B 9/02; F16H 7/02; F16H 25/18
See application file for complete search history.

(56) References Cited

U.S. PATENT DOCUMENTS

| | | | |
|---|---|---|---|
| 4,089,624 A * | 5/1978 | Nichols | F04B 9/02 604/152 |
| 8,087,910 B2 * | 1/2012 | Yajima | F04B 9/02 417/478 |
| 2016/0273527 A1 * | 9/2016 | Teshima | F04B 39/044 |

FOREIGN PATENT DOCUMENTS

| | | | | |
|---|---|---|---|---|
| DE | 102009040126 A1 * | 3/2011 | ............ | B21J 15/025 |
| EP | 3210717 A1 * | 8/2017 | ............ | B23P 19/067 |
| JP | 2015-098855 A | 5/2015 | | |

* cited by examiner

*Primary Examiner* — Charles G Freay
(74) *Attorney, Agent, or Firm* — Osha Bergman Watanabe & Burton LLP

(57) ABSTRACT

A rolling diaphragm pump includes a housing, a rolling diaphragm, a piston, a motor, and a ball screw. Rotational motion of the motor is converted into linear motion by the ball screw to cause the piston to reciprocate, and a volume of a pump chamber is changed by deformation of the rolling diaphragm, thereby sucking and discharging a transport fluid. The ball screw includes a screw shaft placed coaxially with an axis and rotationally driven about the axis relative to the housing by the motor, and a nut portion screwed to the screw shaft so as to be reciprocatable in an axial direction and having an insertion hole formed over an entirety thereof in the axial direction at a position eccentric to the axis. A guide shaft configured to guide reciprocation in the axial direction of the nut portion is inserted through the insertion hole of the nut portion and fixed to the housing.

4 Claims, 7 Drawing Sheets

ROLLING DIAPHRAGM PUMP

TECHNICAL FIELD

The present invention relates to a rolling diaphragm pump.

BACKGROUND ART

For example, in a production process for a semiconductor, a liquid crystal device, an organic EL device, a solar cell, etc., for example, a rolling diaphragm pump described in PATENT LITERATURE 1 has been known as a pump for feeding a chemical solution when the chemical solution is applied or dispensed. In the rolling diaphragm pump, when a piston in a cylinder is caused to reciprocate, a rolling diaphragm becomes deformed to change the volume of a pump chamber, whereby the chemical solution is sucked into the pump chamber and discharged from the pump chamber to the outside.

The piston is connected to a motor via a shaft and a ball screw. Rotational motion of the motor is converted into linear motion by the ball screw, whereby the piston reciprocates together with the shaft. The ball screw includes a screw shaft (output shaft) that reciprocates together with the shaft, and a nut (screw nut) that is rotationally driven relative to the screw shaft by the motor. When the nut is rotationally driven by the motor, the screw shaft reciprocates in the axial direction relative to the nut. At this time, the rotation of the screw shaft relative to the nut is restricted by a restriction mechanism, and the reciprocation of the screw shaft is guided by a guide mechanism (guide member or the like).

CITATION LIST

Patent Literature

PATENT LITERATURE 1: Japanese Laid-Open Patent Publication No. 2015-98855

SUMMARY OF THE INVENTION

Technical Problem

In the rolling diaphragm pump described in PATENT LITERATURE 1, the restriction mechanism for restricting the rotation of the screw shaft is provided separately from the guide mechanism for guiding the reciprocation of the screw shaft. Therefore, the restriction mechanism requires a member (slide member) that restricts the rotation of the screw shaft while reciprocating together with the screw shaft, so that there is a problem that the entire pump becomes long in the axial direction.

The present disclosure has been made in view of such circumstances, and an object of the present disclosure is to provide a rolling diaphragm pump that can be configured to be compact in an axial direction.

Solution to Problem (1) The present disclosure is directed to a rolling diaphragm pump including: a housing; a rolling diaphragm defining a pump chamber in the housing; a piston provided in the housing so as to be reciprocatable in an axial direction along an axis of the housing; a motor serving as a drive source; and a motion conversion mechanism configured to convert rotational motion of the motor into linear motion to cause the piston to reciprocate, wherein a transport fluid is sucked and discharged by changing a volume of the pump chamber by deformation of the rolling diaphragm due to reciprocation of the piston, the motion conversion mechanism includes a screw shaft placed coaxially with the axis and rotationally driven about the axis relative to the housing by the motor, and a nut portion screwed to the screw shaft so as to be reciprocatable in the axial direction and having an insertion portion formed over an entirety thereof in the axial direction at a position eccentric to the axis, and the rolling diaphragm pump includes a guide shaft inserted through the insertion portion of the nut portion, fixed to the housing, and configured to guide reciprocation in the axial direction of the nut portion.

In the rolling diaphragm pump of the present disclosure, when the screw shaft of the motion conversion mechanism is rotated by the motor, the nut portion of the motion conversion mechanism attempts to rotate together with the screw shaft. However, the rotation of the nut portion is restricted by the guide shaft, which is inserted through the insertion portion of the nut portion and fixed to the housing. Accordingly, the nut portion reciprocates in the axial direction relative to the screw shaft. At this time, the guide shaft also guides the reciprocation of the nut portion. Therefore, there is no need to provide a restriction mechanism separately from a guide mechanism as in the conventional art, so that the rolling diaphragm pump can be configured to be compact in the axial direction.

(2) The rolling diaphragm pump of the above (1) preferably further includes a bushing provided in the insertion portion of the nut portion and slidable in the axial direction relative to the guide shaft.

In this case, by the bushing sliding in the axial direction relative to the guide shaft, the nut portion can be caused to reciprocate, so that wear of the nut portion against the guide shaft can be suppressed.

(3) In the rolling diaphragm pump of the above (1) or (2), preferably, an output shaft of the motor is placed parallel to the screw shaft, and the rolling diaphragm pump further includes a transmission mechanism configured to transmit rotation of the output shaft to the screw shaft.

In this case, even when the output shaft of the motor is placed parallel to the screw shaft of the motion conversion mechanism, the rotation of the output shaft can be transmitted to the screw shaft via the transmission mechanism. Accordingly, the motor can be placed so as to be aligned with the motion conversion mechanism in a direction orthogonal to the axial direction, so that the rolling diaphragm pump can be configured to be further compact in the axial direction.

(4) In the rolling diaphragm pump of the above (3), preferably, the transmission mechanism decelerates the rotation of the output shaft at a predetermined deceleration ratio and transmits the rotation of the output shaft to the screw shaft.

In this case, the motor can be downsized, so that energy saving can be achieved.

Advantageous Effects of the Invention

The rolling diaphragm pump according to the present disclosure can be configured to be compact in the axial direction.

DETAILED DESCRIPTION

Next, preferred embodiments will be described with reference to the accompanying drawings.

Figure 1:
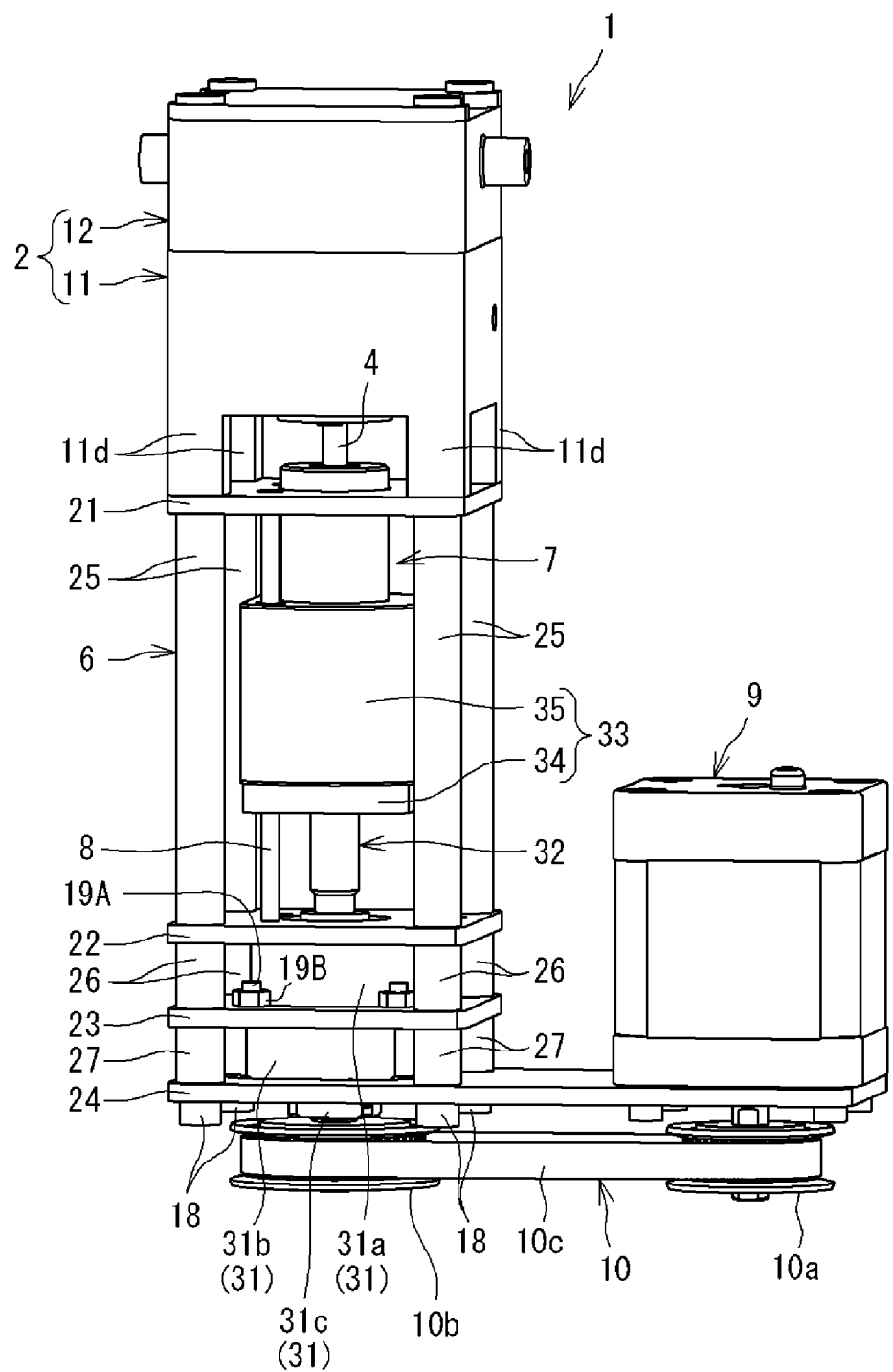
FIG. 1 is a perspective view of a rolling diaphragm pump according to an embodiment of the present disclosure.
Figure 2:
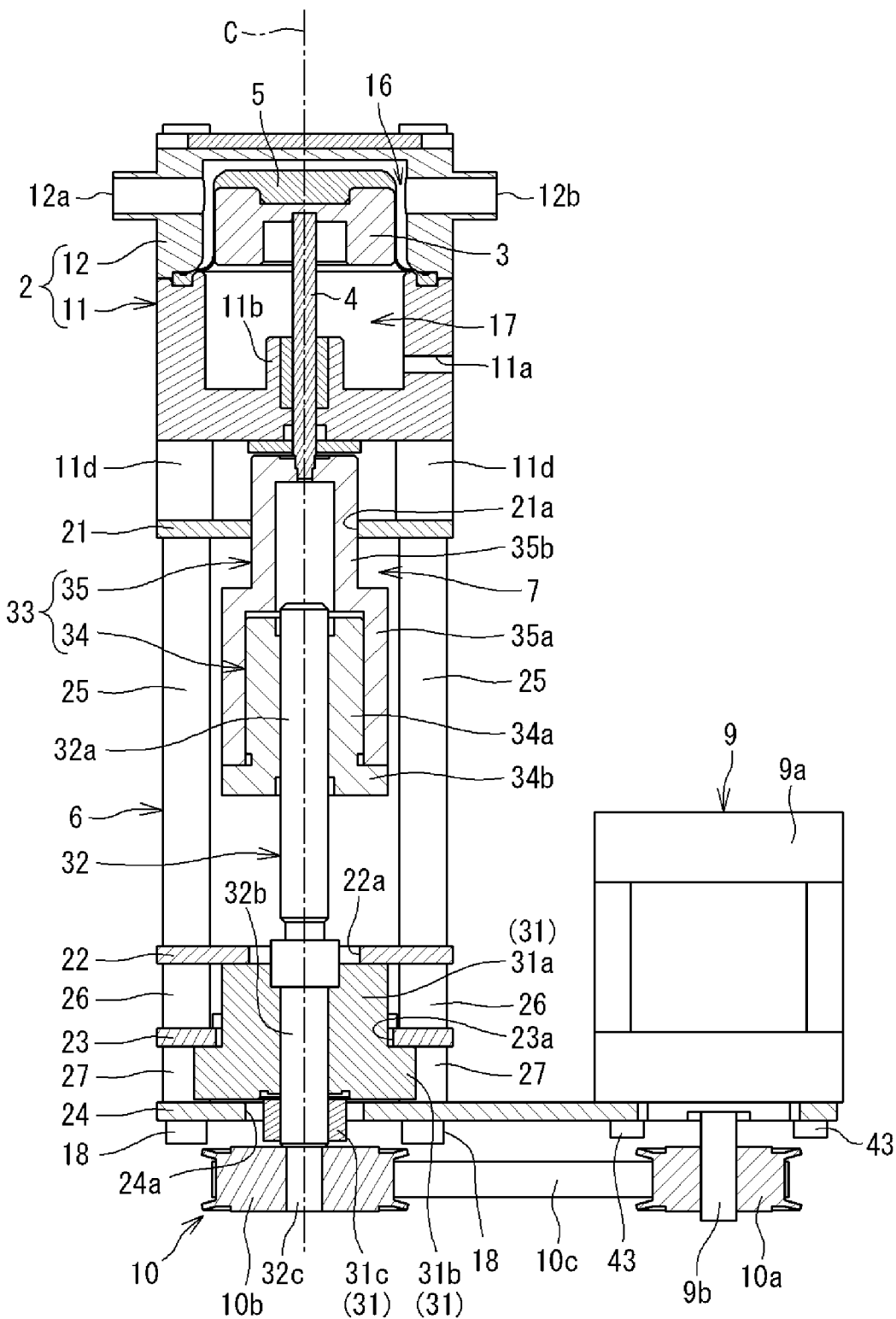
FIG. 2 is a cross-sectional view of the rolling diaphragm pump.

FIG. 1 is a perspective view of a rolling diaphragm pump 1 according to an embodiment of the present disclosure. FIG. 2 is a cross-sectional view of the rolling diaphragm pump 1. In FIG. 1 and FIG. 2, the rolling diaphragm pump 1 (hereinafter, also referred to simply as pump 1) includes a housing 2, a piston 3, a shaft 4, a rolling diaphragm 5, a mounting frame 6, a ball screw 7, a guide shaft 8, a motor 9, and a transmission mechanism 10. In FIG. 2, a cross-section of the motor 9 is not shown. In addition, in the present embodiment, the rolling diaphragm pump 1 is placed such that the longitudinal direction (axial direction) thereof is the up-down direction, but may be placed such that the longitudinal direction (axial direction) thereof is a horizontal direction.

Housing

The housing 2 includes a cylinder 11 and a pump head 12. The cylinder 11 is formed from, for example, stainless steel such as SUS304 in a bottomed tubular shape. The cylinder 11 is placed such that the axial direction thereof is the up-down direction. A ventilation port 11a is formed in a side wall of the cylinder 11 so as to penetrate this side wall. The ventilation port 11a is connected to a decompression device (not shown) such as a vacuum pump or an aspirator. The cylinder 11 includes a plurality of projections 11d which protrude downward from four corners of a bottom wall thereof.

The pump head 12 is formed from, for example, a fluorine resin such as polytetrafluoroethylene (PTFE) in a bottomed tubular shape. The pump head 12 is mounted on the cylinder 11 so as to close the upper opening of the cylinder 11. The internal space of the pump head 12, together with the internal space of the cylinder 11, forms a housing space in which the piston 3 is housed.

A suction port 12a and a discharge port 12b are formed in a side wall of the pump head 12 so as to penetrate this side wall. The suction port 12a is connected to a liquid tank (not shown) for storing a liquid (transport fluid) such as a chemical solution. The discharge port 12b is connected to, for example, a liquid supply portion (not shown) such as a spray nozzle for applying the liquid.

Piston

The piston 3 is housed in the housing 2, and is provided so as to be reciprocatable in an axial direction along an axis C of the housing 2 (up-down direction in FIG. 1). Hereinafter, the axial direction of the housing 2 is also referred to simply as "axial direction". In the present embodiment, the piston 3 is made of an aluminum alloy, for example. The piston 3 is formed in a columnar shape, and has an outer diameter smaller than the inner diameter of the housing 2 (the cylinder 11 and the pump head 12). The outer peripheral surface of the piston 3 is located so as to be spaced at a predetermined interval from the inner peripheral surface of the cylinder 11 or the pump head 12 opposed to this outer peripheral surface.

Figure 3:
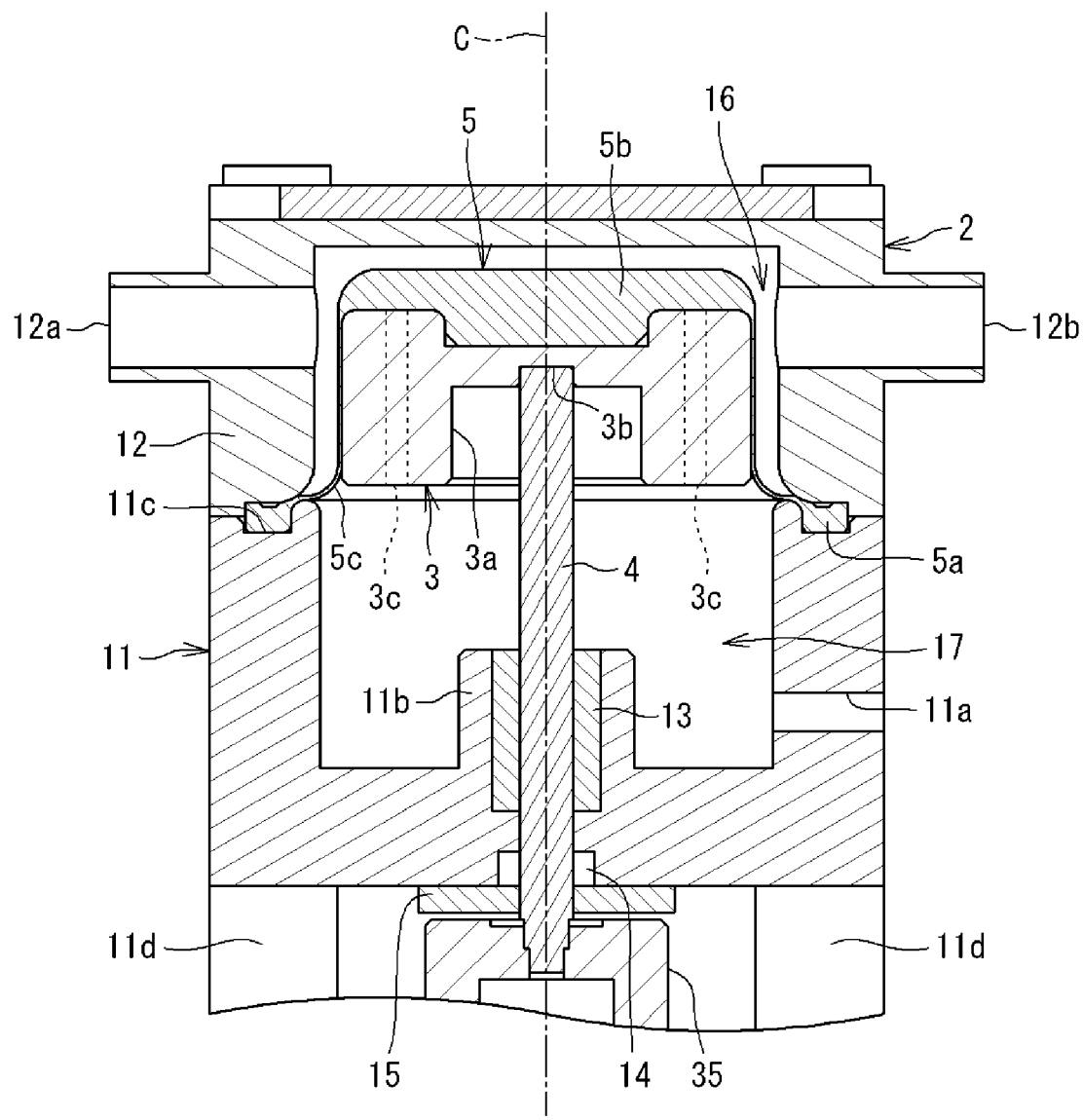
FIG. 3 is an enlarged cross-sectional view of a main part in FIG. 2.

FIG. 3 is an enlarged cross-sectional view of a main part in FIG. 2. In FIG. 3, a circular depression 3a is formed at a center portion of the lower surface of the piston 3 so as to be open on the lower side. The depression 3a is formed coaxially with the axis C. The depression 3a is formed in a size that allows a later-described boss portion 11b of the cylinder 11 to be fitted thereinto.

A circular recess 3b is further formed at a center portion of the bottom surface of the depression 3a. The recess 3b is also formed coaxially with the axis C. The recess 3b has a smaller diameter than the depression 3a, and is formed in a size that allows an axially upper end portion of the shaft 4 to be fitted thereinto. The piston 3 has a plurality of air passages 3c formed at predetermined intervals in the circumferential direction thereof so as to penetrate the piston 3 in the axial direction.

Shaft

The shaft 4 moves together with the piston 3 in a state where the shaft 4 is in contact with the piston 3 from below in the axial direction. The shaft 4 of the present embodiment is a member separate from the piston 3, and is formed in a round bar shape from, for example, hardened steel such as high carbon chromium bearing steel, or stainless steel such as martensitic stainless steel. The shaft 4 is placed coaxially with the axis C. The axially upper end portion of the shaft 4 comes into contact with the lower side in the axial direction of the piston 3 by being fitted into the recess 3b of the piston 3.

The cylindrical boss portion 11b is integrally formed at a bottom wall of the cylinder 11 so as to penetrate this bottom wall. The boss portion 11b protrudes upward at a center portion of the bottom wall of the cylinder 11, and is formed coaxially with the axis C. The shaft 4 is inserted into the boss portion 11b via a bushing 13. Accordingly, the shaft 4 is supported by the boss portion 11b via the bushing 13 so as to be movable in the axial direction.

A packing 14 such as an O-ring is provided between an axially lower end portion of the boss portion 11b and the shaft 4. The packing 14 is made of, for example, a rubber material such as a fluorine rubber. A holding member 15 is provided on the lower surface of the bottom wall of the cylinder 11 so as to hold the packing 14 from below. The holding member 15 is formed from, for example, stainless steel such as SUS304.

Rolling Diaphragm

The rolling diaphragm 5 is housed in the housing 2. The rolling diaphragm 5 is made of a fluorine resin such as PTFE. The rolling diaphragm 5 includes an annular fixed portion 5a, a disc-shaped movable portion 5b, and a connecting portion 5c.

The fixed portion 5a is fitted into an annular recess 11c formed on the axially upper end surface of the cylinder 11, and is fixed to the housing 2 in a state where the fixed portion 5a is interposed between the cylinder 11 and the pump head 12. The movable portion 5b is fixed to the upper surface of the piston 3 on the radially inner side of the fixed portion 5a. The outer diameter of the movable portion 5b is substantially equal to the outer diameter of the piston 3. The movable portion 5b reciprocates in the axial direction together with the piston 3.

The connecting portion 5c connects the radially inner end of the fixed portion 5a and the radially outer end of the movable portion 5b. The connecting portion 5c is formed thin (in a thin film shape) and has flexibility. Meanwhile, the fixed portion 5a and the movable portion 5b are formed sufficiently thicker than the connecting portion 5c so as to have rigidity.

Figure 4:
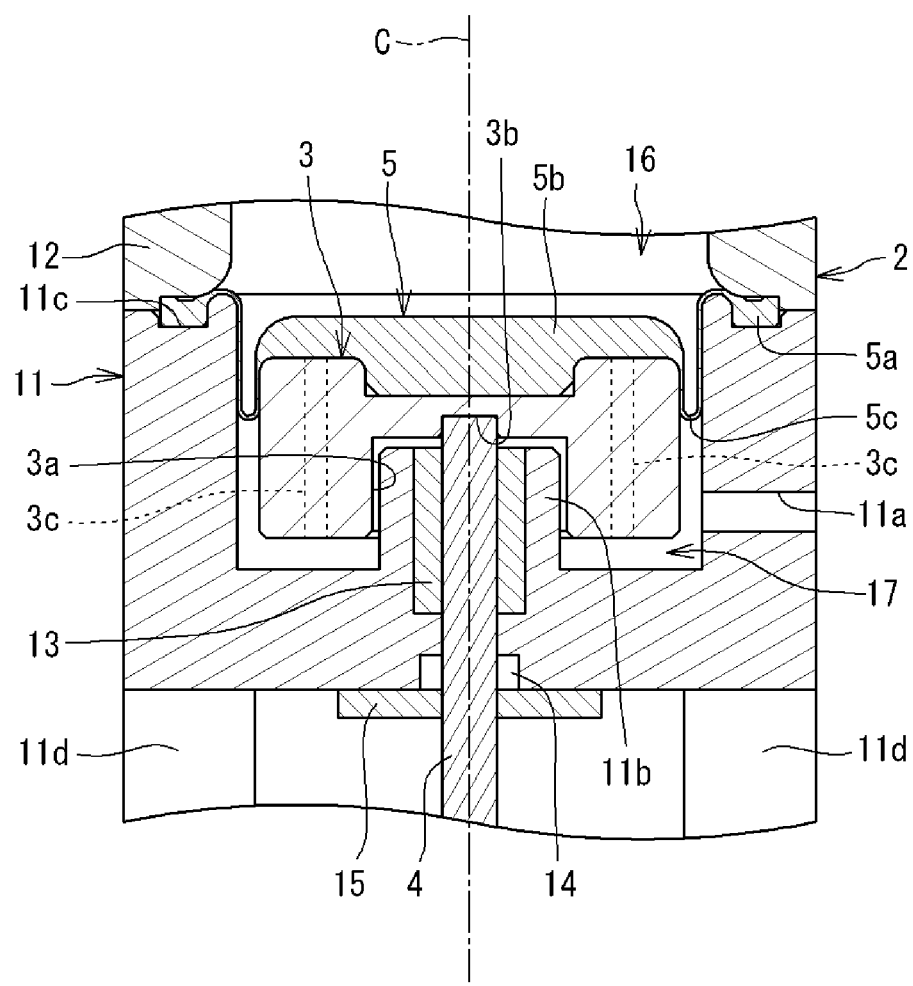
FIG. 4 is an enlarged cross-sectional view of the main part in a state where a piston has moved to a lowermost position.

As shown in FIG. 3, when the piston 3 is at an uppermost position, the connecting portion 5c is deformed into a cylindrical shape along the outer peripheral surface of the piston 3, and the entire inner peripheral surface of the connecting portion 5c is in close contact with the outer peripheral surface of the piston 3. From this state, when the piston 3 moves to a lowermost position as shown in FIG. 4, the connecting portion 5c becomes deformed so as to be bent in a U cross-sectional shape between the inner peripheral surface of the cylinder 11 and the outer peripheral surface of the piston 3. In this state, the connecting portion 5c is in close contact with both the inner peripheral surface of the cylinder 11 and the outer peripheral surface of the piston 3.

Pump Chamber and Decompression Chamber

Figure 5:
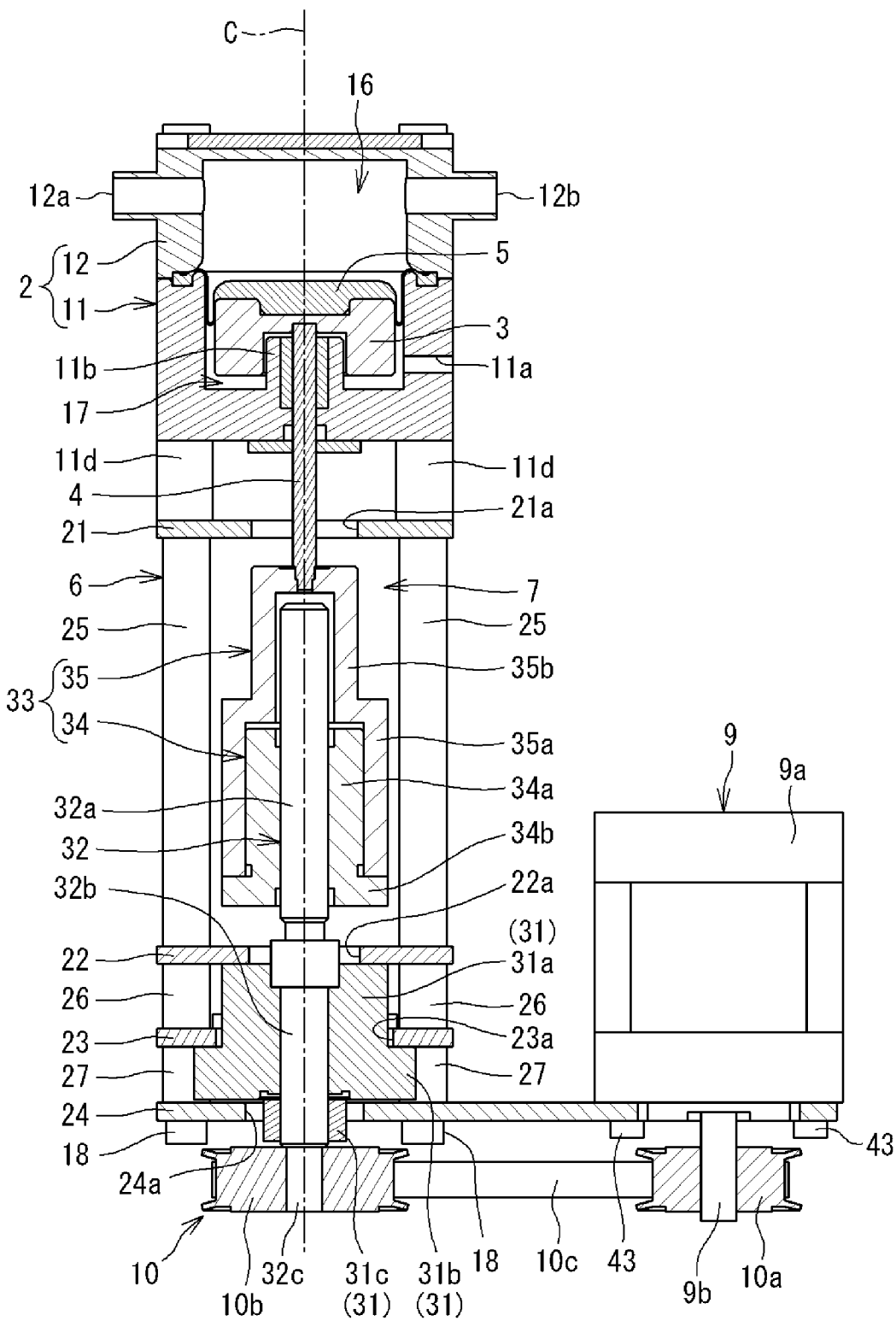
FIG. 5 is a cross-sectional view of the entire pump in a state where the piston has moved to the lowermost position.

FIG. 5 is a cross-sectional view of the entire pump 1 in a state where the piston 3 has moved to the lowermost position. In FIG. 5, a pump chamber 16 and a decompression chamber 17 are defined in the housing 2 by the rolling diaphragm 5. The pump chamber 16 is formed so as to be surrounded by the rolling diaphragm 5 and the pump head 12. The pump chamber 16 communicates with both the suction port 12a and the discharge port 12b. The volume of the pump chamber 16 is changed by the reciprocation of the piston 3 (see FIG. 2).

The decompression chamber 17 is defined in the housing 2 by the piston 3, the rolling diaphragm 5, and the cylinder 11. The decompression chamber 17 communicates with the ventilation port 11a. When the pump 1 is driven, the pressure of the decompression chamber 17 is reduced to a predetermined pressure (negative pressure) by the decompression device, which is connected thereto via the ventilation port 11a. Accordingly, the connecting portion 5c of the rolling diaphragm 5 can be reliably brought into close contact with the inner peripheral surface of the cylinder 11 and the outer peripheral surface of the piston 3. In addition, as shown in FIG. 3, the pressure between the lower surface of the movable portion 5b of the rolling diaphragm 5 and the upper surface of the piston 3 is reduced through the plurality of air passages 3c, which communicate with the decompression chamber 17, and thus the lower surface of the movable portion 5b can be reliably brought into close contact with the upper surface of the piston 3.

Mounting Frame

In FIG. 1 and FIG. 2, the ball screw 7 and the motor 9 are mounted on the mounting frame 6 below the housing 2. The mounting frame 6 includes a first partition plate 21, a second partition plate 22, a third partition plate 23, a fourth partition plate 24, a plurality of first spacers 25, a plurality of second spacers 26, and a plurality of third spacers 27. The first to third partition plates 21 to 23 are all formed in square shapes that are the same. The fourth partition plate 24 is formed in a rectangular shape. The first to third spacers 25 to 27 are all formed in cylindrical shapes. The mounting frame 6 of the present embodiment includes four first spacers 25, four second spacers 26, and four third spacers 27.

The upper surface of the first partition plate 21 is in contact with the lower end of each projection 11d of the cylinder 11. A through hole 21a through which a second tubular portion 35b described later is inserted is formed in a center portion of the first partition plate 21. The axially upper ends of the first spacers 25 are in contact with the four corners of the lower surface of the first partition plate 21, respectively. Each first spacer 25 is formed long in the axial direction so as to allow a nut portion 33 (described later) of the ball screw 7 to reciprocate in the axial direction. The upper surface of the second partition plate 22 is in contact with the axially lower end of each first spacer 25.

A through hole 22a through which a non-threaded portion 32b described later is inserted is formed in a center portion of the second partition plate 22. The axially upper ends of the second spacers 26 are in contact with the four corners of the lower surface of the second partition plate 22, respectively. Each second spacer 26 is formed shorter in the axial direction than each first spacer 25. The upper surface of the third partition plate 23 is in contact with the axially lower end of each second spacer 26.

A through hole 23a through which a first support portion 31a described later is inserted is formed in a center portion of the third partition plate 23. The axially upper ends of the third spacers 27 are in contact with the four corners of the lower surface of the third partition plate 23, respectively. Each third spacer 27 is also formed shorter in the axial direction than each first spacer 25. The upper surface of the fourth partition plate 24 is in contact with the axially lower end of each third spacer 27. A through hole 24a through which a third support portion 31c described later is inserted is formed on one side in the longitudinal direction (right-left direction in FIG. 2) of the fourth partition plate 24.

The mounting frame 6 is fixed to the housing 2 by a plurality of bolts 18 (four bolts 18 in FIG. 1). Each bolt 18 is inserted through the fourth partition plate 24, the interior of the third spacer 27, the third partition plate 23, the interior of the second spacer 26, the second partition plate 22, the interior of the first spacer 25, and the first partition plate 21 in this order, and tightened into each projection 11d of the cylinder 11.

Ball Screw

The ball screw 7 is a motion conversion mechanism that converts the rotational motion of the motor 9 into linear motion to cause the piston 3 to reciprocate. The ball screw 7 includes a support portion 31, a screw shaft 32, the nut portion 33, and a plurality of balls (not shown).

The support portion 31 is fixed to the mounting frame 6 at a position spaced downward in the axial direction from the housing 2. The support portion 31 includes the cylindrical first support portion 31a, a rectangular second support portion 31b provided on the lower surface of the first support portion 31a, and the cylindrical third support portion 31c provided on the lower surface of the second support portion 31b.

The first support portion 31a is inserted through the through hole 23a of the third partition plate 23. The axially upper end of the first support portion 31a is in contact with the lower surface of the second partition plate 22. The second support portion 31b is placed between the third partition plate 23 and the fourth partition plate 24, and is fixed to the third partition plate 23 by bolts 19A and nuts 19B. The third support portion 31c is inserted through the through hole 24a of the fourth partition plate 24.

The screw shaft 32 is placed coaxially with the axis C. The screw shaft 32 includes an externally threaded portion 32a, and the non-threaded portion 32b supported by the support portion 31. The non-threaded portion 32b penetrates the through hole 22a of the second partition plate 22, and is inserted through the first to third support portions 31a to 31c of the support portion 31. The non-threaded portion 32b is supported so as to be rotatable relative to the support portion 31.

An axially lower end portion of the non-threaded portion 32b protrudes downward from the third support portion 31c, and is a connection portion 32c to which the transmission mechanism 10 is connected. The non-threaded portion 32b is rotationally driven by the motor 9 via the transmission mechanism 10. The details thereof will be described later. The externally threaded portion 32a extends upward from the upper end of the non-threaded portion 32b, and is placed between the first partition plate 21 and the second partition plate 22.

The nut portion 33 is screwed to the externally threaded portion 32a of the screw shaft 32 so as to be reciprocatable in the axial direction via the plurality of balls. The nut portion 33 reciprocates between the housing 2 and the support portion 31. The nut portion 33 includes a nut body 34 and a coupling body 35. The nut body 34 includes a cylindrical internally threaded portion 34a which is screwed to the externally threaded portion 32a of the screw shaft 32, and a rectangular plate-shaped flange portion 34b which is formed at an axially lower end portion of the internally threaded portion 34a. The flange portion 34b protrudes radially outward from the internally threaded portion 34a.

The coupling body 35 couples the nut body 34 and the shaft 4. The coupling body 35 includes a first tubular portion 35a which is fitted to the outer periphery of the nut body 34, and the second tubular portion 35b into which the externally threaded portion 32a of the screw shaft 32 is inserted. The first tubular portion 35a and the second tubular portion 35b are placed coaxially with the axis C. The first tubular portion 35a is fixed to the flange portion 34b by a bolt 37 (see FIG. 6) in a state where the axially lower end of the first tubular portion 35a is in contact with the flange portion 34b of the nut body 34. Accordingly, the coupling body 35 is integrally coupled to the nut body 34.

The second tubular portion 35b of the coupling body 35 is formed in a bottomed tubular shape. The second tubular portion 35b is integrally formed with the first tubular portion 35a such that the lower opening in the axial direction thereof communicates with the interior of the first tubular portion 35a. The inner diameter of the second tubular portion 35b is larger than the outer diameter of the externally threaded portion 32a. The outer diameter of the second tubular portion 35b is smaller than the hole diameter of the through hole 21a of the first partition plate 21. Accordingly, when the coupling body 35 reciprocates relative to the externally threaded portion 32a, the second tubular portion 35b is inserted into the through hole 21a of the first partition plate 21. A lower end portion of the shaft 4 is fixed to a lid wall on the upper side in the axial direction of the second tubular portion 35b. Accordingly, the coupling body 35 is integrally coupled to the shaft 4.

Guide Shaft

Figure 6:
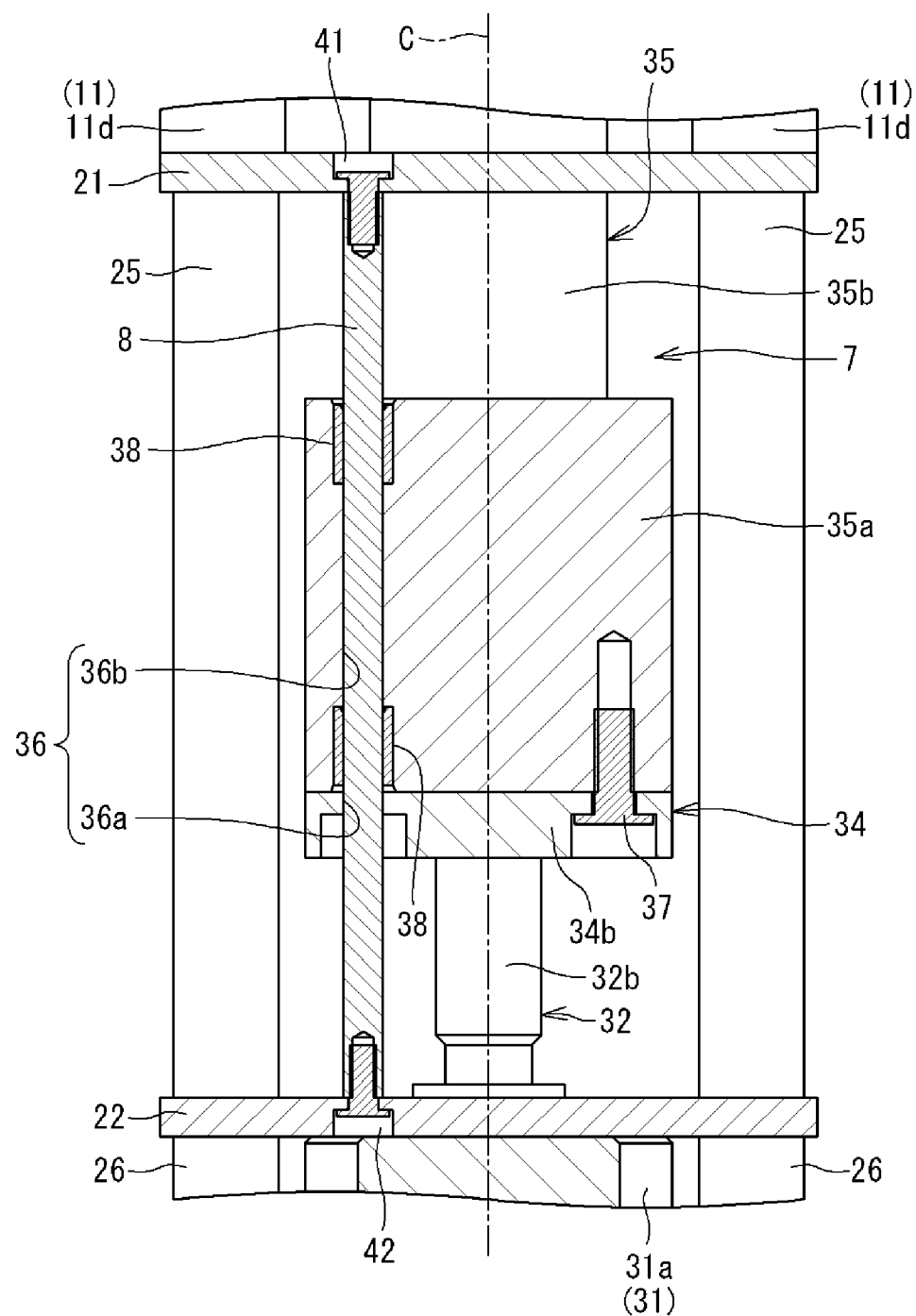
FIG. 6 is an enlarged cross-sectional view showing an area around a guide shaft.

FIG. 6 is an enlarged cross-sectional view showing an area around the guide shaft 8. In FIG. 2 and FIG. 6, an insertion hole (insertion portion) 36 is formed in the nut portion 33 of the ball screw 7 at a position eccentric to the axis C so as to penetrate the entirety of the nut portion 33 in the axial direction. The insertion hole 36 is composed of, for example, a circular hole. The hole diameter of the insertion hole 36 is larger than the outer diameter of the guide shaft 8 described later. The insertion hole 36 includes a first hole portion 36a which penetrates the flange portion 34b of the nut body 34 in the axial direction, and a second hole portion 36b which penetrates the first tubular portion 35a of the coupling body 35 in the axial direction. A pair of cylindrical bushings 38 are fitted and fixed to both axial end portions of the second hole portion 36b, respectively.

The guide shaft 8 is inserted through the insertion hole 36 of the nut portion 33 via the pair of bushings 38. Each bushing 38 is slidable in the axial direction along the outer peripheral surface of the guide shaft 8. The axial length of the guide shaft 8 is equal to the axial length of each first spacer 25. An axially upper end portion of the guide shaft 8 is fixed to the first partition plate 21 by a bolt 41 in a state where the axially upper end portion of the guide shaft 8 is in contact with the lower surface of the first partition plate 21. An axially lower end portion of the guide shaft 8 is fixed to the second partition plate 22 by a bolt 42 in a state where the axially lower end portion of the guide shaft 8 is in contact with the upper surface of the second partition plate 22. Accordingly, the guide shaft 8 inserted through the insertion hole 36 of the nut portion 33 is fixed to the housing 2 via the mounting frame 6.

Due to the above, when the screw shaft 32 rotates about the axis C relative to the support portion 31, the nut portion 33 attempts to rotate about the axis C together with the externally threaded portion 32a of the screw shaft 32, but the rotation of the nut portion 33 is restricted by the guide shaft 8. Accordingly, the nut portion 33 is reciprocatable in the axial direction relative to the externally threaded portion 32a. At this time, since the bushings 38 slide along the outer peripheral surface of the guide shaft 8, the reciprocation of the nut portion 33 can also be guided by the guide shaft 8.

Motor

In FIG. 1 and FIG. 2, the motor 9 is a drive source that rotationally drives the screw shaft 32 of the ball screw 7. The motor 9 is provided on the fourth partition plate 24 in a state where the motor 9 is aligned with the support portion 31 of the ball screw 7 in a direction (right-left direction in FIG. 2) orthogonal to the axial direction. The motor 9 includes a motor body 9a and an output shaft 9b.

The motor body 9a is fixed to the fourth partition plate 24 by a plurality of bolts 43 in a state where the motor body 9a is in contact with the upper surface of the fourth partition plate 24. The output shaft 9b protrudes downward through the fourth partition plate 24 from the lower end surface of the motor body 9a. Accordingly, the output shaft 9b of the motor 9 is placed parallel to the connection portion 32c of the screw shaft 32 below the fourth partition plate 24.

Transmission Mechanism

Figure 7:
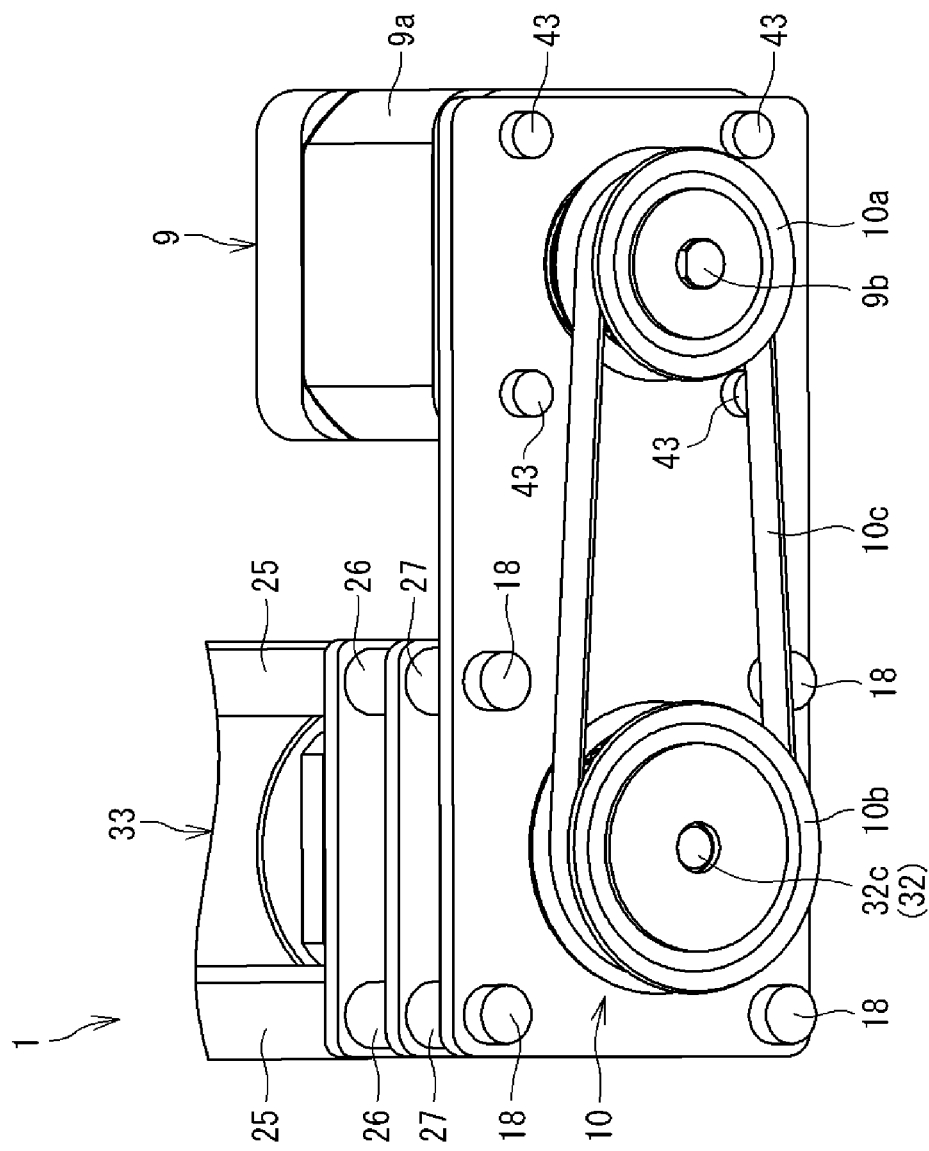
FIG. 7 is a perspective view of the rolling diaphragm pump as seen from below in an axial direction.

FIG. 7 is a perspective view of the pump 1 as seen from below in the axial direction. In FIG. 2 and FIG. 7, the transmission mechanism 10 is a mechanism that transmits the rotation of the output shaft 9b of the motor 9 to the connection portion 32c of the screw shaft 32. The transmission mechanism 10 is placed below the fourth partition plate 24. The transmission mechanism 10 includes a drive pulley 10a, a driven pulley 10b, and a belt 10c.

The drive pulley 10a is connected to the output shaft 9b of the motor 9, and is rotationally driven by the output shaft 9b. The driven pulley 10b is connected to the connection portion 32c of the screw shaft 32, and is rotatable about the axis C together with the connection portion 32c. The outer diameter of the driven pulley 10b is larger than the outer diameter of the drive pulley 10a. The belt 10c is formed in an endless shape, and is trained on the drive pulley 10a and the driven pulley 10b.

When the output shaft 9b of the motor 9 is rotated, the rotation of the output shaft 9b is transmitted to the connection portion 32c of the screw shaft 32 via the drive pulley 10a, the belt 10c, and the driven pulley 10b. At this time, since the outer diameter of the driven pulley 10b is larger than the outer diameter of the drive pulley 10a, the rotation of the output shaft 9b is decelerated at a predetermined deceleration ratio and transmitted to the connection portion 32c of the screw shaft 32.

Operation of Pump

When the motor 9 is driven, the screw shaft 32 of the ball screw 7 rotates about the axis C from the output shaft 9b via the transmission mechanism 10. When the screw shaft 32 rotates, the rotational motion thereof is converted into axial linear motion of the nut portion 33, and the piston 3 reciprocates in the axial direction via the shaft 4. When the piston 3 reciprocates, the rolling diaphragm 5 becomes deformed and the volume of the pump chamber 16 changes.

At this time, a suction process (see FIG. 5) in which the piston 3 moves axially downward to suck the liquid into the pump chamber 16 and a discharge process (see FIG. 2) in which the piston 3 moves axially upward to discharge the liquid from the pump chamber 16 are repeated alternately. Accordingly, the liquid stored in the liquid tank can be supplied from the pump 1 to the liquid supply portion at a fixed quantity and constant flow rate.

Advantageous Effects of Embodiment

As described above, in the rolling diaphragm pump 1 of the present embodiment, when the screw shaft 32 of the ball screw 7 is rotated by the motor 9, the nut portion 33 of the ball screw 7 attempts to rotate together with the screw shaft 32. However, the rotation of the nut portion 33 is restricted by the guide shaft 8, which is inserted through the insertion hole 36 of the nut portion 33 and fixed to the housing 2. Accordingly, the nut portion 33 reciprocates in the axial direction relative to the screw shaft 32. At this time, the guide shaft 8 also guides the reciprocation of the nut portion 33. Therefore, there is no need to provide a restriction mechanism separately from a guide mechanism as in the conventional art, so that the rolling diaphragm pump 1 can be configured to be compact in the axial direction.

The bushings 38, which are slidable in the axial direction relative to the guide shaft 8, are provided in the insertion hole 36 of the nut portion 33. Accordingly, by the bushings 38 sliding in the axial direction relative to the guide shaft 8, the nut portion 33 of the ball screw 7 can be caused to reciprocate, so that wear of the nut portion 33 against the guide shaft 8 can be suppressed.

The rotation of the output shaft 9b of the motor 9 is transmitted to the screw shaft 32 of the ball screw 7 by the transmission mechanism 10. Accordingly, the motor 9 can be placed so as to be aligned with the ball screw 7 in the direction orthogonal to the axial direction, so that the rolling diaphragm pump 1 can be configured to be further compact in the axial direction.

The rotation of the output shaft 9b of the motor 9 is decelerated at the predetermined deceleration ratio and transmitted to the screw shaft 32 by the transmission mechanism 10. Accordingly, the motor 9 can be downsized, so that energy saving can be achieved.

Others

The insertion portion formed over the entirety in the axial direction of the nut portion 33 is not limited to the insertion hole 36, and may be a groove that is open on the outer side of the nut portion 33 (left side in FIG. 6). The nut portion 33 in the ball screw 7 of the present embodiment is configured with the nut body 34 and the coupling body 35 as separate members, but may be configured as a single member obtained by integrating the nut body 34 and the coupling body 35. The motion conversion mechanism is not limited to the ball screw 7, and may be a feed screw having no balls.

The transmission mechanism 10 of the present embodiment is composed of a pair of the pulleys 10a and 10b and the belt 10c, but is not limited thereto. For example, the transmission mechanism 10 may be composed of a pair of sprockets and a chain trained on these sprockets. The output shaft 9b of the motor 9 may be connected directly to the connection portion 32c of the screw shaft 32 without the transmission mechanism 10 therebetween.

The embodiment disclosed herein is merely illustrative and not restrictive in all aspects. The scope of the present invention is defined by the scope of the claims rather than the meaning described above, and is intended to include meaning equivalent to the scope of the claims and all modifications within the scope.

REFERENCE SIGNS LIST 1 rolling diaphragm pump
2 housing
3 piston
5 rolling diaphragm
7 ball screw (motion conversion mechanism)
8 guide shaft
9 motor
9b output shaft
10 transmission mechanism
16 pump chamber
32 screw shaft
33 nut portion
36 insertion hole (insertion portion)
38 bushing
C axis

The invention claimed is:
1. A rolling diaphragm pump comprising:
a housing;
a rolling diaphragm defining a pump chamber in the housing;
a piston in the housing that is reciprocatable in an axial direction along an axis of the housing;
a motor serving as a drive source;

a motion conversion mechanism that converts rotational motion of the motor into linear motion to cause the piston to reciprocate; and a mounting frame fixed to the housing and to which the motion conversion mechanism is attached, wherein a transport fluid is sucked and discharged by changing a volume of the pump chamber by deformation of the rolling diaphragm due to reciprocation of the piston, the mounting frame comprises a first partition plate and a second partition plate spaced apart from each other in the axial direction, the motion conversion mechanism comprises:

a screw shaft disposed coaxially with the axis between the first partition plate and the second partition plate and rotationally driven about the axis relative to the housing by the motor; and a nut portion screwed to the screw shaft, reciprocatable in the axial direction and, having an insertion portion formed over an entirety of the nut portion in the axial direction at a position eccentric to the axis, the rolling diaphragm pump further comprises a guide shaft inserted through the insertion portion of the nut portion, fixed to the housing, and that guides the reciprocation of the piston in the axial direction, the nut portion further comprises:

a nut body screwed to the screw shaft and that is reciprocatable in the axial direction;

a first tubular portion fitted to an outer periphery of the nut body and fixed to the nut body; and a second tubular portion having a smaller outer diameter than the first tubular portion and into which a portion of the screw shaft that protrudes from the nut body toward the first partition plate is inserted, the insertion portion is disposed at a portion of the first tubular portion that is radially outward of the second tubular portion, and the first partition plate has an insertion hole into which the second tubular portion is inserted.

2. The rolling diaphragm pump according to claim 1, further comprising:

a bushing in the insertion portion of the nut portion, wherein the bushing is slidable in the axial direction relative to the guide shaft.

3. The rolling diaphragm pump according to claim 1, wherein an output shaft of the motor is disposed parallel to the screw shaft, and the rolling diaphragm pump further comprises a transmission mechanism configured to transmit rotation of the output shaft to the screw shaft.

4. The rolling diaphragm pump according to claim 3, wherein the transmission mechanism decelerates the rotation of the output shaft at a predetermined deceleration ratio and transmits the decelerated rotation of the output shaft to the screw shaft.

* * * * *